June 3, 1930.                J. F. O'CONNOR                1,761,273
                         SHOCK ABSORBER FOR VEHICLES
                          Filed Oct. 21, 1926          2 Sheets-Sheet 1
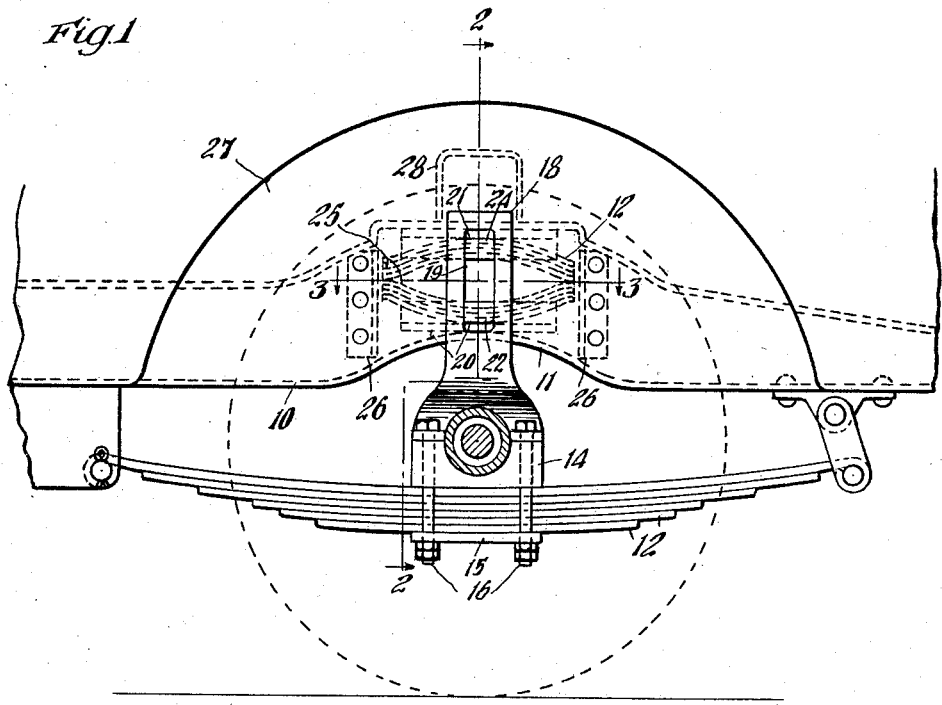
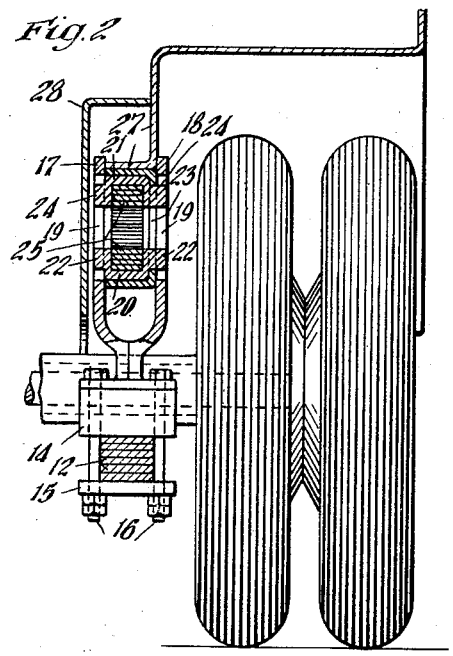
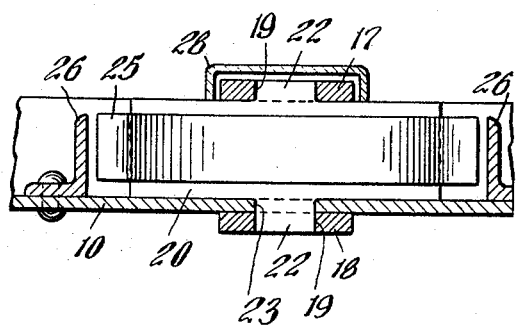
Witness
Inventor
John F. O'Connor
By George I. Haight
His Atty

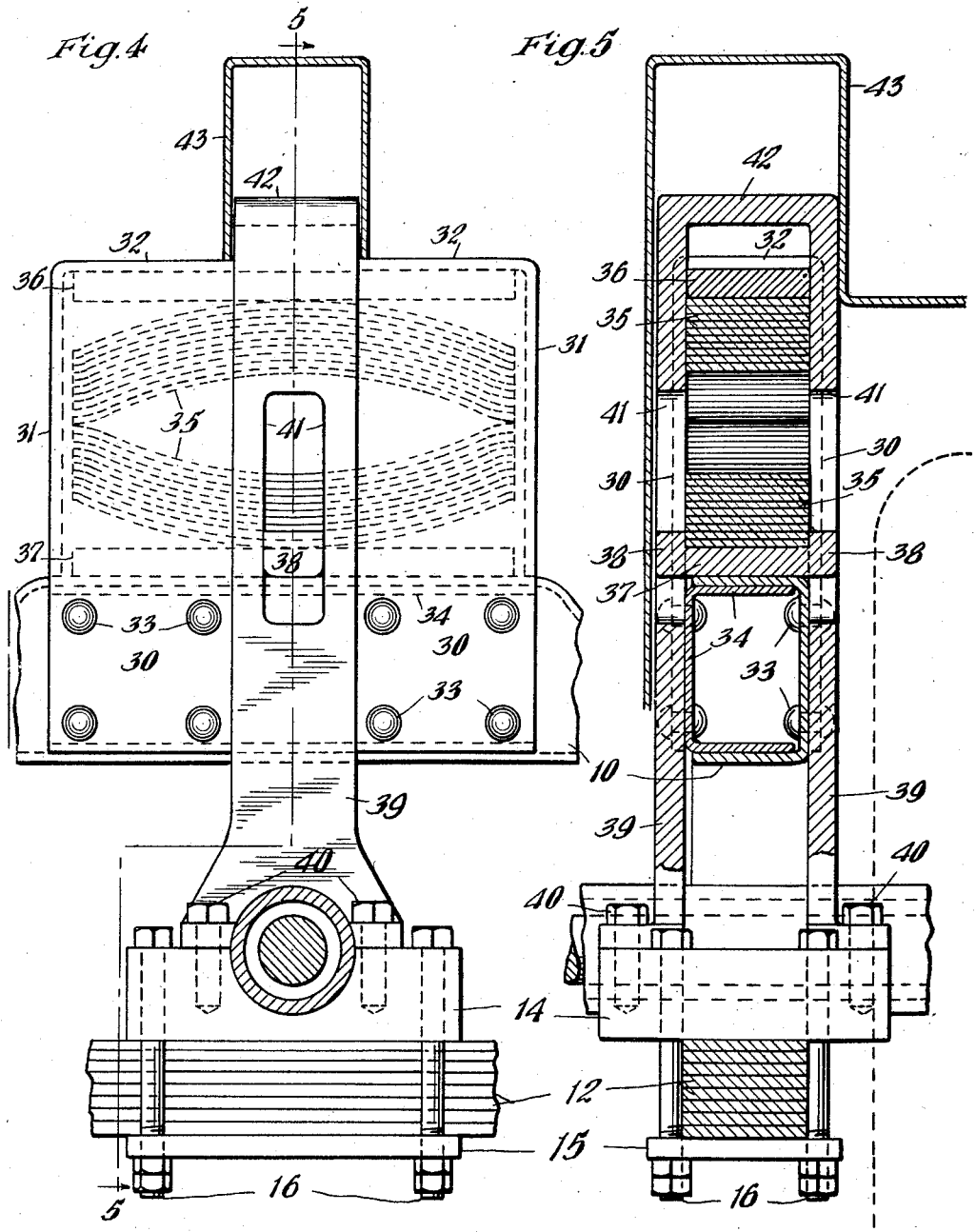

Patented June 3, 1930

1,761,273

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

SHOCK ABSORBER FOR VEHICLES

Application filed October 21, 1926. Serial No. 143,032.

This invention relates to improvements in shock absorbers for vehicles.

An object of the invention is to provide a shock absorbing mechanism for motor vehicles and especially heavy vehicles of the bus type, wherein the shock absorbing mechanism acts in conjunction with the usual vehicle springs and is rendered operative to absorb excessive shocks after the vehicle springs have been compressed to a predetermined extent in absorbing the lighter shocks.

A more particular object of the invention is to provide a mechanism of the character indicated, wherein yieldable means are mounted upon the vehicle body and are adapted to be operated by a yoke connected to the axle housing of the vehicle, said yoke being arranged to move in unison with the axle housing when the usual vehicle springs carrying the latter are flexed, the yoke being designed to compress the yieldable means only after the usual springs and axle housing have moved a predetermined distance upwardly or downwardly, thereby providing an arrangement which is brought into action to assist in absorbing the heavier shocks, while remaining inoperative during the normal movement of the usual springs to absorb the lighter shocks.

Other and further objects of the invention will more clearly appear from the description and claims hereinafter following.

In the drawings, forming a part of this specification, Figure 1 is an elevational view of the rear portion of one side of the vehicle as viewed from the outer side of one frame member of the chassis, the axle and axle housing being shown in section and the rear wheel in dotted lines the invention being illustrated as associated with the axle housing and the frame member. Figure 2 is a transverse vertical sectional view corresponding substantially to line 2—2 of Figure 1 and showing the usual fender in section and the wheels in elevation. Figure 3 is an enlarged horizontal sectional view taken substantially on the line 3—3 of Figure 1. Figure 4 is a fragmentary side elevational view, somewhat similar to Figure 1, and on an enlarged scale showing a slightly different embodiment of the invention. And Figure 5 is a transverse vertical sectional view of the invention on the line 5—5 of Figure 4.

As shown in the drawings, 10 represents a side frame member of a vehicle, being of the usual channel formation, and having an offset 11, which is spanned by the usual leaf spring assembly 12, said assembly being secured at its ends to the frame 10, in the usual way. The spring assembly intermediate its ends is connected to the axle housing 14 by means of a clamp including a bottom plate 15 connected to the axle housing 14 by means of bolts 16.

Secured at their lower ends to the axle housing 14, by means of the bolts 16, are yoke members 17 and 18, said yoke members having their upper end portions spaced apart and the member 18 extending vertically upward at the outer side of, and adjacent the web portion of the member 10, while the yoke 17 extends vertically upward adjacent the inner edges of the flanges of said member. Each of the yoke members 17 and 18 is provided with a longitudinally extending elongated slot 19, the slots 19—19 being adapted for the reception of lower and upper followers 20 and 21.

The follower 20 is of elongated formation, channel-shaped in cross section, the web of the channel formation being adapted to rest upon the lower flange of the member 10 as best shown in Figure 2. Each side wall of the channel-shaped follower 20 is provided with a laterally extending lug 22 one of said lugs extending outwardly through a vertical slot 23 formed in the web of the frame member 10 and into the slot of the yoke member 18. The lug 22 at the opposite side of the follower extends into the slot 19 of the yoke 17. The follower 21 is of a construction identically similar to the follower 20, except that it is oppositely disposed with reference to the latter. The follower 21 has lugs 24—24 one of which extends outwardly through the slot 23 in the web of the frame member and into the slot 19 of the yoke member 18. The lug 24 at the opposite side of the follower 21 extends into the slot 19 of the yoke member 17, the follower 21 bearing against the undersurface of the top flange of the frame member 10.

Interposed between the followers 20 and 21 is a plurality of curved leaf springs, arranged in oppositely disposed sets 25—25, the lower set of leaf springs being disposed in the channel formed in the follower 20 while the upper set of leaf springs is disposed in the channel of the upper follower 21, the opposite ends of the sets of springs 25—25 bearing against each other in opposite directions. Angle bars 26—26 are riveted to the web of the frame member 10 in line with the ends of the sets 25—25 of the leaf springs as best shown in Figure 3, to prevent displacement thereof when the same are flexed. The fender 27 is provided with an angular portion which rests on top of the upper flange of the frame member 10, the yoke members being disposed upon opposite sides of the angular portion and adapted to move vertically with respect thereto. An off-set 28 is provided for housing the mechanism, as best shown in Figure 2.

In operation, the usual springs 12 will take care of the lighter shocks, the vibration of the springs being transmitted to the yokes 17 and 18 through movement of the axle housing, without causing sufficient movement of the yokes to bring about movement of the follower 20 and 21, as the slots 19—19 in the yoke members 17 and 18 are of sufficient length as to permit vibration of an ordinary character without effecting movement of the followers 20 and 21. When the vehicle encounters conditions which bring about excessive inward movement of the springs 12, the yoke members are reciprocated upwardly to such an extent as to bring the bottom walls of the slots 19—19 thereof into engagement with the under-surfaces of the lugs 22 and 22 of the follower 20, causing flexing of the sets of springs 25—25, which is resisted by the follower 21 which bears against the undersurface of the top flange of the member 10 during this action. Upon rebound of the spring assembly 12, the yoke members will be reciprocated downwardly and excessive movement of the spring assembly downwardly will cause the top walls of the slots 19—19 of the yoke members to carry the follower 21 downwardly therewith, compressing the spring sets 25—25 against the lower flange of the frame member 10, thus absorbing shocks in opposite directions after the spring assembly and axle housing have moved a predetermined amount in taking up ordinary shocks, so as to cushion the heavier shocks to which the vehicle is subjected.

Referring now to Figures 4 and 5 of the drawings, there is shown a somewhat different embodiment of the invention. In this construction the frame, the chassis side frame member and spring assembly are of the character before described. In this construction, a housing is mounted upon the upper surface of the frame 10, said housing being provided with side walls 30—30, end walls 31—31 and top wall 32, one of the side walls 30 being riveted to the web portion of the frame member 10 by means of rivets indicated at 33, while the opposite side wall is riveted to a channel-shaped filler member 34 which fits between the upper and lower flanges of the frame member 10, as best shown in Figure 5. Mounted in the housing is a plurality of sets of oppositely disposed leaf springs 35—35, and arranged at the top of the upper set of springs is a follower 36. A follower 37 is provided beneath the lower set of leaf springs, said follower being provided with oppositely disposed lugs 38—38 which extend outwardly through suitable vertically disposed slots in the housing.

A yoke member is provided, having legs 39—39 secured to the axle housing by means of screw bolts 40—40, each leg 39 of the yoke being provided with a slot 41 adapted for the reception of the lugs 38—38 of the follower 37. At their upper ends, the legs 39—39 of the yoke are provided with a connecting portion 42 adapted to bear upon the upper surface of the follower 36, the top wall 32 of the housing being provided with an opening to permit downward movement of the connecting portion 42 of the yoke into engagement with the follower 36 to compress the spring sets 35—35. The fender 43 is provided with an off-set to permit the required movement of the yoke.

In operation, the vehicle springs will take care of the lighter shocks, the vibration of the springs and axle housing being transmitted to the yoke without causing sufficient movement thereof to actuate the followers 36 and 37, the slots 41—41 of the yoke permitting certain movement thereof with respect to the follower 37 as to prevent co-action therebetween until after the parts have moved a relatively large extent, while the connecting portion 42 of the yoke is spaced from the follower 36 for a like purpose. When the vehicle encounters conditions which bring about excessive inward movement of the spring and axle housing, the yoke is reciprocated upwardly to such an extent as to bring the walls of the slots 41—41 into engagement with the lugs 38—38 on the follower 37, causing upward movement of the latter and causing flexing of the sets of springs 35—35 against the follower 36 which bears against the top wall of the housing. Upon downward movement of the axle housing and springs, the yoke will be reciprocated downwardly and excessive movement will cause the connecting portion 42 of the yoke to come into engagement with the follower 36, compressing the sets of springs against the follower 39 which is supported upon the top flange of the side frame member 10.

While I have herein shown and described what I consider the preferred manner in carrying out the invention, the same is merely illustrative, and I contemplate all changes and modifications which come within the scope of the claims appended hereto.

I claim:

1. In a shock absorbing mechanism, the combination with a vehicle body member and a spring member; of oppositely disposed sets of curved leaf springs mounted on one of said members; and yoke means secured to the other of said members and encircling said leaf springs to flex the same upon relative movement between said spring member and said body member beyond a predetermined extent, said yoke serving to flex one set only of the curved leaf springs when moved in one direction, and to flex the opposite set only of the curved leaf springs when moved in the opposite direction.

2. In a shock absorbing mechanism, the combination with a vehicle body member and spring member for supporting said body; of curved leaf springs, said springs being arranged in two sets, one set having a plurality of spring members with the curved portions disposed in one direction, and the other set having a plurality of spring members disposed in the opposite direction, the ends of said sets being anchored on one of said members; and yoke means connected to the other of said members and adapted to co-act with one or the other of the sets of said leaf springs to flex the same in opposite directions upon relative movement between said spring member and said body member in opposite directions.

3. In a device of the character described, the combination with a vehicle body member and a spring member; yieldable means carried by one of said members; followers arranged at opposite sides of said yieldable means and movable in one direction but restrained against movement in the opposite direction; and means connected to the other of said members having means for engaging one of said followers when moved in one direction to flex said yieldable means and for engaging the other follower when moved in the opposite direction for flexing said yieldable means.

4. In a device of the character described, the combination with a side frame of a vehicle; spring means for supporting said vehicle; yieldable means associated with said side frame and including followers at opposite sides of said yieldable means, said followers being connected to said frame normally to permit movement toward each other but restrain movement away from each other; and yoke means connected with said spring means, said yoke means being adapted to engage said followers to move the same toward each other when said yoke means is moved in opposite directions.

5. In a device of the character described, the combination with a channel side frame of a vehicle, said channel being provided with a vertically disposed slot and spring means for supporting said vehicle; followers mounted between the flanges of said channel member and provided with projections extending through the slot in the web of said channel; oppositely disposed leaf springs interposed between said followers; and yoke portions connected to said spring means and having slots for the reception of the lugs on said followers.

6. In a shock absorbing mechanism, the combination with a vehicle body member and a spring member; of a housing connected to one of said members; curved leaf springs disposed in said housing, said springs being arranged so that the curved portion of one of the same is disposed in one direction, and the curved portion of another disposed in the opposite direction, said springs being anchored adjacent their ends in said housing; and means connected with the other of said members and encircling said springs intermediate the anchored ends thereof, and operating to flex one or the other of said curved springs, dependent upon the direction of relative movement between said spring member and said body member.

In witness that I claim the foregoing I have hereunto subscribed my name this 18th day of October 1926.

JOHN F. O'CONNOR.